June 25, 1935. T. H. LONG 2,005,901
INDUCTION SHEET HEATER
Filed July 29, 1932
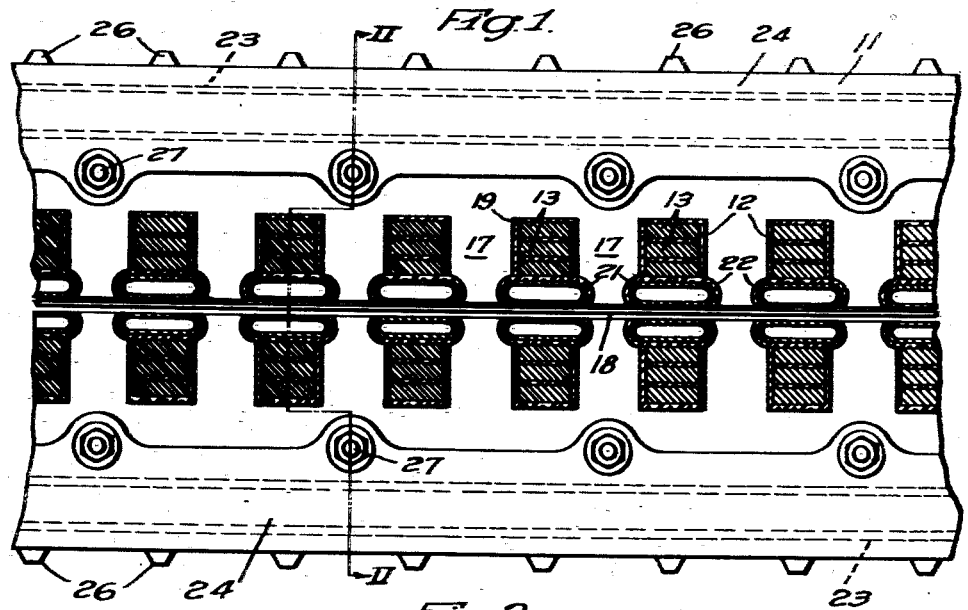
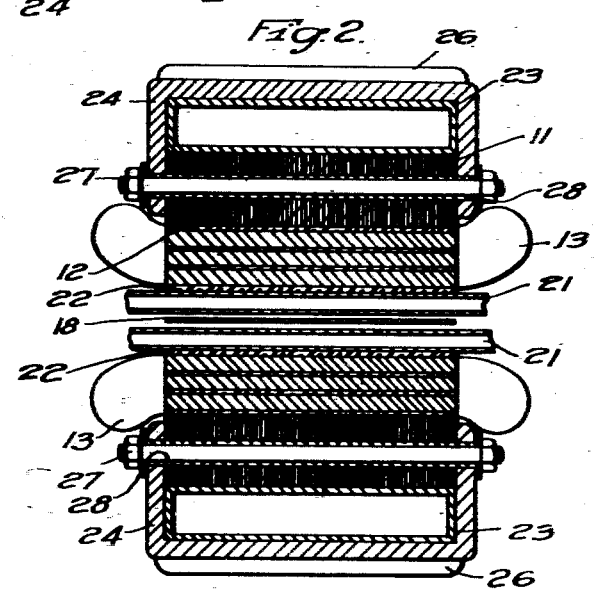
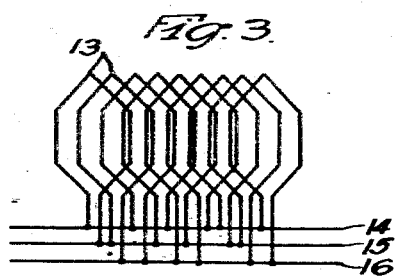
INVENTOR
Thomas H. Long.
BY
W. R. Coley
ATTORNEY
WITNESSES:

Patented June 25, 1935

2,005,901

UNITED STATES PATENT OFFICE 2,005,901

INDUCTION SHEET HEATER

Thomas H. Long, Irwin, Pa., assignor to Westinghouse Electric & Manufacturing Company, East Pittsburgh, Pa., a corporation of Pennsylvania Application July 29, 1932, Serial No. 625,585

6 Claims. (Cl. 219—13)

My invention relates to inductive heating and particularly to the inductive heating of metal sheets or strips.

An object of my invention is to provide a relatively simple device for inductively heating either a moving or stationary metal sheet or metal strip.

Another object of my invention is to provide a device which will simultaneously inductively heat metal strips or sheets and assist longitudinal movement thereof.

Another object of my invention is to provide an inductive heating device which will embody a heat screen between the material being heated and the coil and core structure.

Another object of my invention is to provide a laminated core structure having a polyphase energizing winding located in slots therein, the coils being retained in the slots by fluid-cooled tubular slot wedges and in which a heat-removing means is located at that side of the laminated structure away from the slotted face thereof.

In practicing my invention, I provide an elongated laminated magnetic structure having slots in one face thereof in which are located distributed polyphase energizing coils, with flattened tubular slot wedges, and means including a thin-wall tubular conduit held against the back surface of the laminated structure to cool the same. This same structure may be duplicated by a similar opposing member in order to increase the useful flux density and thereby effect relatively rapid heating of the material.

In the single sheet of drawings:

Figure 1 is a view, partially in side elevation and partially in section, of a device embodying my invention, Fig. 2 is a view in lateral section therethrough taken on the line II—II of Fig. 1, and Fig. 3 is a schematic diagram of connections of the energizing coils.

As shown more particularly in Figs. 1 and 2 of the drawing, my inductive heating device includes a plurality of relatively shallow but elongated iron or steel laminations 11, the length of which may be any suitable or desired amount in accordance with the design thereof and in accordance with the material to be inductively heated. The laminations are provided with slots 12 in one face, in which are located a plurality of distributed coils 13 of a polyphase energizing winding, the schematic diagram of connections of which is shown in Fig. 3 of the drawing. In general, this winding is what may be called a distributed winding and, when the respective coils are connected to the conductors 14, 15 and 16 of a three-phase energizing circuit, the coils will be properly energized to cause an alternating flux to be generated, which flux traverses the teeth 17 of the magnetic laminations and will, therefore, traverse a metal sheet 18 at substantially right angles to the longitudinal faces thereof whereby the same is inductively heated.

As shown in Figs. 1 and 2, the coils 13, or more particularly the inductors thereof, are suitably insulated by electric insulating material 19 from the walls of the slots 12 in a manner well known in the art.

I provide slot wedges to retain the coils 13 in the slots, which slot wedges are preferably in the form of flattened tubular conduit portions 21 which are so shaped as to fit into the respective slots 12 at the outer ends thereof and the respective conduits 21 are insulated from the magnetic material by electric-insulating material 22. While I have illustrated no connection from one conduit portion 21 to an adjacent conduit portion in the next slot, I desire it to be understood that connections are provided between each two adjacent slot conduits in such manner that the conduits are connected either in series or in parallel circuit so that a cooling fluid, such as air or water, may be circulated therethrough, thereby providing a heat screen between the inductively heated metal sheet 18 and the copper of the energizing winding.

In order to be able to cool the other surface of the laminations 11, I provide a flattened conduit 23, which conduit may be of substantially rectangular shape in lateral section and which is held in close operative engagement with the rear surface of the laminations by a metal member 24 of substantially channel shape in lateral section. The member 24 may be provided with lateral stiffening ribs 26 and may be made of non-magnetic material.

The member 24, of channel-shape, may be held in its proper operative position relatively to the laminations 11 by a plurality of bolts or studs 27 extending through the member of channel-shape adjacent its edges and also through the laminations, a bushing 28 of a suitable electric-insulating material being used to space the studs 27 from the laminations 11 in a manner well known in the art. The member of channel-shape, therefore, serves not only to retain the fluid traversed conduit 23 in its proper operative position against the rear surface of the laminations 11, but is also effective in clamping the laminations tightly together. The rear surface of the laminations may be machined smooth to obtain a better or closer contact between the laminations and member 23.

As may be seen from Figs. 1 and 2, I may use two opposing structures of the kind hereinbefore described and a sheet or strip of metal may be moved therebetween and, while I have shown no strip or sheet supporting means, it is to be understood that any such means may be employed.

If a plurality of coils, as hereinbefore described, is provided and the respective coils are properly connected to the source of three-phase electric energy, it is obvious that not only will an alternating flux be generated but a travelling field will be provided which will exert a mechanical force on the sheet metal tending to move the sheet or strip of metal in the direction of motion of the traveling field. This mechanical force will be proportional to the rate of heating and inversely proportional to the velocity of movement of the field.

It is obvious that the copper in the slots will be subjected to a relatively high temperature caused by heated sheet metal and it is, of course, desirable to provide means for protecting the copper in the slots as well as the insulation surrounding the copper over its entire length against this high temperature.

It is further obvious that a compromise must be made as to the amount of material, both copper and iron or steel, which is utilized in a heating appliance of this kind. That is, it is possible to use a relatively small amount of copper and iron, but this will result in rather large losses because of the high current and flux density in the conductors and the laminations, respectively. The subdivision of copper, if a relatively heavy copper conductor is to be utilized, must be made in the direction of the leakage flux which, in the device shown in Fig. 1, is substantially at right angles to the teeth themselves. If, therefore, it is desired to make the losses relatively small, the amount of copper and of laminated steel must be made larger, but it is found that there are definite limits to such increase, which limitations can, to some extent, be avoided by the use of frequencies higher than those now ordinarily used. If very much higher frequencies are utilized, it is, of course, necessary to provide some means for varying and increasing the frequency which necessitates the use of some form of frequency changer with its attendant losses.

In order, therefore, to obtain a device which will have a relatively long life and not be too expensive to build, I provide the fluid cooling means shown in the drawing. The plurality of connected conduits 21 constitute, in effect, a heat screen between the sheet metal being treated and the copper and, to a certain extent, between the sheet metal and the teeth themselves. I prefer to make the thickness of the wall of conduit 23 quite small so that, in effect, this conduit is flexible and any pressure of a fluid cooling means in the conduit 23 will effect a closer engagement between that wall of conduit 23 in engagement with the laminations and the laminations themselves. It is obvious that the pressure of the conduit 23 against the laminations 11 increases in proportion to the pressure of the cooling fluid traversing the conduit 23, whereby a highly efficient heat path is provided between the laminations 11 and a cooling means. It is obvious that the conduits 21 and 23 may be connected to constitute one circuit for the cooling fluid, but it is preferable to have the cooling fluid traverse the conduits 21 first, as it is obvious that a greater amount of heat is generated adjacent to the conduits 21 than is generated adjacent the conduit or conduits 23.

Various modifications may be made in the device embodying my invention without departing from the spirit and scope thereof, and I desire, therefore, that only such limitations shall be placed thereon as are imposed by the prior art or are set forth in the appended claims.

I claim as my invention:

1. In a device for inductively heating metal sheet, a slotted laminated core structure, a polyphase energizing coil in said slots, and coil-cooling means located in said slots and retaining the coils therein.

2. A device as set forth in claim 1 in which the coil-cooling means is a fluid-traversed conduit constituting the slot wedge.

3. A device as set forth in claim 1 in which the coil-cooling means is a fluid-traversed flattened conduit constituting the slot wedge.

4. In a device for simultaneously inductively heating and moving a metal sheet, a laminated core structure having slots in one face thereof, a polyphase energizing coil in the slots, a fluid-traversed conduit operatively engaging that face of the core opposite to the slots and means for holding said conduit against the core face.

5. A device as set forth in claim 4 in which the conduit has a relatively thin flexible wall adjacent the core whereby pressure of the fluid in the conduit effects better operative engagement between the conduit wall and the face of the core.

6. A device for simultaneously inductively heating and moving a metal sheet including a slotted laminated core structure, a polyphase energizing coil in said slots, a cooling means for the coils located in the slots and constituted by tubular slot wedges and cooling means for the core located adjacent that face of the core opposite to the slotted face and including a fluid-traversed conduit and means holding the conduit against the core, the contact pressure between the conduit and the face of the core being in direct proportion to the pressure of a fluid in the conduit.

THOMAS H. LONG.